United States Patent
Ichikawa et al.

(10) Patent No.: US 6,886,599 B2
(45) Date of Patent: May 3, 2005

(54) GAS SUPPLY UNIT

(75) Inventors: Masaki Ichikawa, Kasugai (JP); Satoru Isayama, Kasugai (JP); Shigenobu Nishida, Kasugai (JP); Toshikazu Miwa, Kasugai (JP)

(73) Assignee: CKD Corporation, Komaki (JP)

( * ) Notice: Subject to any disclaimer, the term of this patent is extended or adjusted under 35 U.S.C. 154(b) by 299 days.

(21) Appl. No.: 10/305,962

(22) Filed: Nov. 29, 2002

(65) Prior Publication Data

US 2003/0106597 A1 Jun. 12, 2003

(30) Foreign Application Priority Data

Dec. 6, 2001  (JP) ..................... 2001-372206
Jun. 12, 2002 (JP) ..................... 2002-170788

(51) Int. Cl.[7] ........................................... F16K 11/10
(52) U.S. Cl. ............................................. 137/884
(58) Field of Search ............................ 137/269, 270, 137/271, 884, 597

(56) References Cited

U.S. PATENT DOCUMENTS 5,605,179 A * 2/1997 Strong, Jr. et al. .......... 137/884
6,123,340 A * 9/2000 Sprafka et al. ............. 277/608
6,149,718 A * 11/2000 Cowan et al. ................ 96/147
6,283,143 B1 * 9/2001 Adachi, Jr. et al. ......... 137/341
6,659,131 B2 * 12/2003 Tsourides ................... 137/884

FOREIGN PATENT DOCUMENTS

JP          A 11-165012         6/1999

* cited by examiner

Primary Examiner—John Fox
(74) Attorney, Agent, or Firm—Oliff & Berridge, PLC

(57) ABSTRACT

A gas supply unit includes a base member, two or more fluid control devices, and a plurality of passage blocks attached to an upper surface of the base member and lower surfaces of the fluid control devices to connect the fluid control devices in fluid communication. One of the passage blocks is provided with an inlet port and an outlet port, a filter cavity sealingly formed between the inlet port and the outlet port, and a filter built-in the filter cavity.

25 Claims, 12 Drawing Sheets

US 6,886,599 B2

GAS SUPPLY UNIT

BACKGROUND OF THE INVENTION

1. Field of the Invention

The present invention relates to a gas supply unit which is used to supply process gas to be used in a semiconductor manufacturing process and, more particularly, to a compact and lightweight gas supply unit.

2. Description of Related Art

In a wafer treatment operation of a semiconductor manufacturing process, gas is used for etching or the like of a photoresist process (photoresist application, exposure, development, and etching). Accordingly, a gas supply circuit is provided to supply the specific kind of process gas selected from among several kinds of gases to a chamber. The gas supply circuit includes a gas supply line arranged according to the kinds of gases to be supplied, whereby to feed each kind of gas to the chamber through fluid control devices such as a massflow controller and others. Each gas is replaced by use of purge gas such as nitrogen gas because each gas has corrosivity and toxicity. For such gas replacement and further gas exhaust processing, the above gas supply line is combined with a purge gas supply line and a vent line.

To control the flow or exhaust of process gas and purge gas, therefore, the gas supply line needs to have fluid devices such as a plurality of valves and a massflow controller as shown in FIG. 17. These fluid control devices 101 to 108 constituting the gas supply line are unitized for the purpose of achieving a smaller installation area and a shorter flow passage. A gas supply unit 100 is thus constructed of those devices 101 to 108 which are mounted in alignment with each other on a single base member 110 through passage blocks 121 to 128 fixed on the base member 110. Each of the passage blocks 121 to 128 is provided with a V-shaped flow passage as shown in a section view of a block 122 in FIG. 17.

Of the above fluid control devices, a filter 102 would be mounted on the upper surfaces of the passage blocks 121 and 122 as with other fluid control devices. This mounting manner is disclosed in for example Japanese patent unexamined publication No. 11-165012. The case that the filter is mounted to the gas supply unit of FIG. 17 is shown in FIG. 18. The passage blocks 121 to 128 are attached to the base member 110 and the fluid control devices 101 to 108 are mounted on the upper surfaces of the passage blocks 121 to 128. In particular, the filter 102 is constructed of a flat filter 102a disposed in a filter cavity 102b. One side of the filter 102 (an upper part of the filter cavity 102b divided by the filter 102) is communicated with a V-shaped passage 121a formed in the passage block 121 through a passage 102c, and the other side of the filter 102 (a lower part of the filter cavity 102b) is communicated with a V-shaped passage 122a formed in the passage block 122 through a passage 102d.

Each shape of the passage blocks 121 to 128 is described below, referring to FIGS. 19 and 20; however, these blocks 121 to 128 are identical in shape and therefore only the block 121 is explained. FIG. 19 is a plane view of the passage block 121 seen from above and FIG. 20 is a section view of same taken along the line XX—XX of FIG. 19.

The block 121 is formed with two through holes 131 which are used for securing the block 121 to the base member 110 with bolts. In each through hole 131, a counter bore 131a is formed to receive the head of a bolt. Four screw holes 132 are provided to attach the fluid control device to the block 121 with bolts. The V-shaped passage 121a has an opening part 133 formed with a gasket holding part 133a for holding a seal-gasket.

The above conventional gas supply unit 100, however, has the following problems.

The gas supply unit is usually desired to be installed near a chamber in order to prevent the process gas having a changeable quality from being delivered around through a long pipe line to the chamber. Accordingly, in some cases, the gas supply unit 100 would be not only horizontally installed but also vertically set against a furnace casing of the chamber. In the conventional gas supply unit 100, however, a large number of fluid control devices 101 to 108 are mounted, which results in an increase in weight and length of the gas supply unit 100 itself.

The gas supply unit is generally used so that plural units are arranged in parallel lines or rows. This would need a large space for installation, which makes it impossible to install the units near the chamber. Furthermore, attaching a combination of several gas supply units 100 each being heavy and large would be a difficult work.

SUMMARY OF THE INVENTION

The present invention has been made in view of the above circumstances and has an object to overcome the above problems and to provide a gas supply unit so compact and lightweight as to be installed near a chamber.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a gas supply unit including a base member, two or more fluid control devices, and a plurality of passage blocks attached to an upper surface of the base member and lower surfaces of the fluid control devices, wherein one of the passage blocks includes an inlet port and an outlet port, a filter cavity sealingly formed between the inlet port and the outlet port, and a filter built in the filter cavity.

According to another aspect of the invention, there is provided a gas supply unit including a base member, two or more fluid control devices, and a plurality of passage blocks attached to an upper surface of the base member and lower surfaces of the fluid control devices, wherein one of the passage blocks includes an inlet port and an outlet port, a filter cavity formed between the inlet port and the outlet port and provided with an opening on a base member side, and a metal filter built in the filter cavity, and the metal filter is positioned by a filter retainer of a cup-like shape having an upward opening to sealingly close the filter cavity, the block is provided with an inlet passage formed through a side wall of the filter retainer to bring the filter cavity in communication with the inlet port, and the block is further provided with an outlet passage formed above the metal filter to bring the filter cavity in communication with the outlet port.

Furthermore, according to another aspect of the invention, there is provided a gas supply unit including a base member, two or more fluid control devices, and a plurality of passage blocks attached to an upper surface of the base member and lower surfaces of the fluid control devices, wherein one of the passage blocks includes an inlet port and an outlet port, a filter cavity formed between the inlet port and the outlet port and provided with an opening in a side surface of the block, and a filter built in the filter cavity, and the filter has a cylindrical shape having an open end and a closed end and is positioned in place when inserted in the filter cavity through the opening thereof, the filter being communicated with the inlet port through the open end and the inlet port being communicated with the outlet port through the filter.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
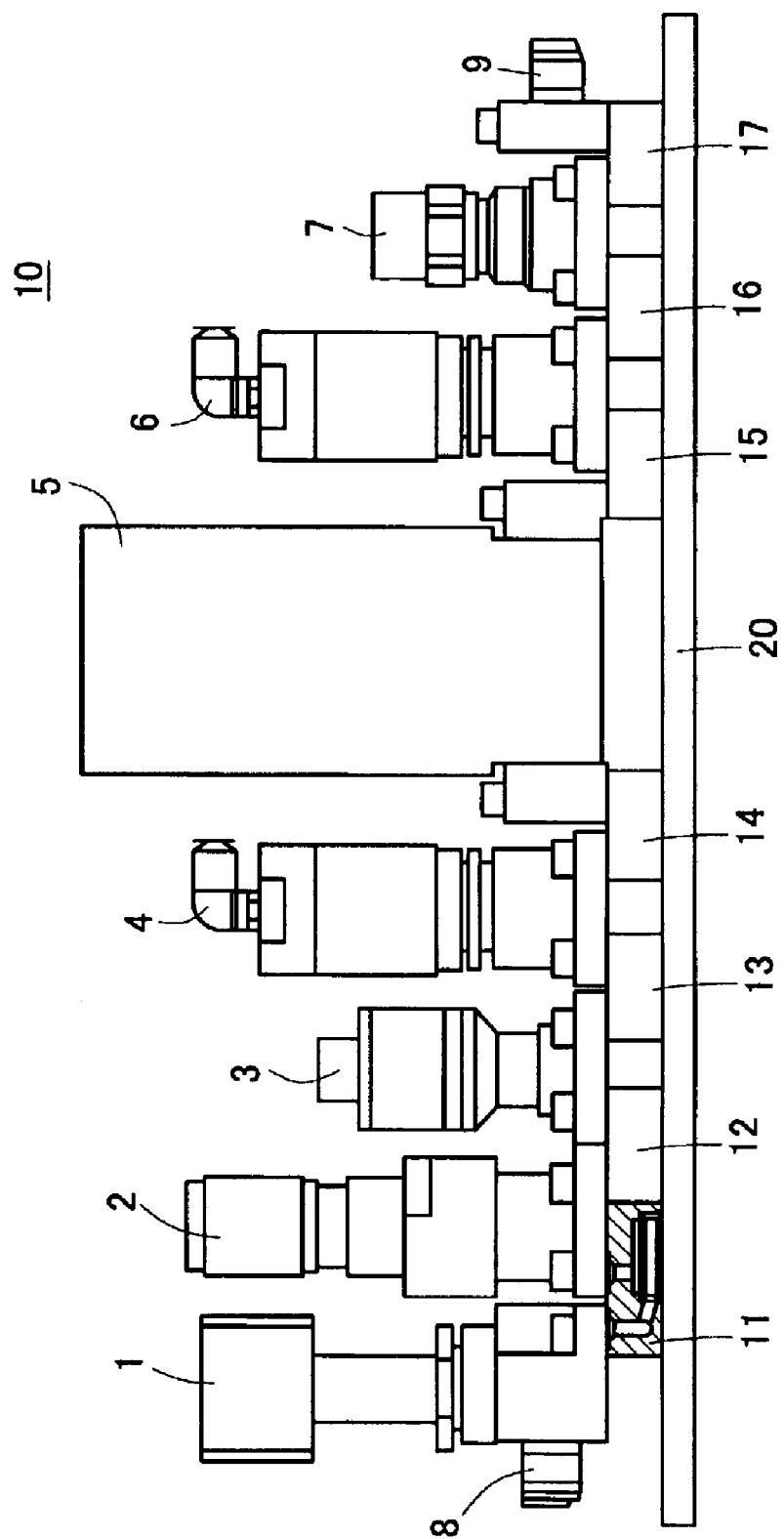
FIG. 1 is a side view of an entire gas supply unit in a first embodiment according to the invention.

A detailed description of a preferred embodiment of a gas supply unit embodying the present invention will now be given referring to the accompanying drawings. FIG. 1 is a side view of the gas supply unit.

This gas supply unit 10 includes various fluid control devices designed in modules, namely, a hand valve 1, a regulator 2, a pressure transducer 3, a shutoff valve 4, a massflow controller 5, a purge valve 6, and a check valve 7. These devices are mounted individually on a base member 20 in the above order from upstream. The modules 1 to 7 are interconnected through passage blocks 11 to 17 in the same manner as those in the conventional gas supply unit 100. The base member 20 used in the present embodiment is a base plate or a rail.

A difference between the gas supply unit 10 in the present embodiment and the conventional gas supply unit 100 (FIG. 17) is in that the modules constituting the unit 10 do not include the filter 102. This filter 102 is an essential element for a gas supply line in order to remove mixed impurities in the gas supplied to the line. In the present embodiment, instead of using such filter configured in a module like the hand vale 1 and the regulator 2, a passage block 11 internally having a filter function is used.

Figure 17:
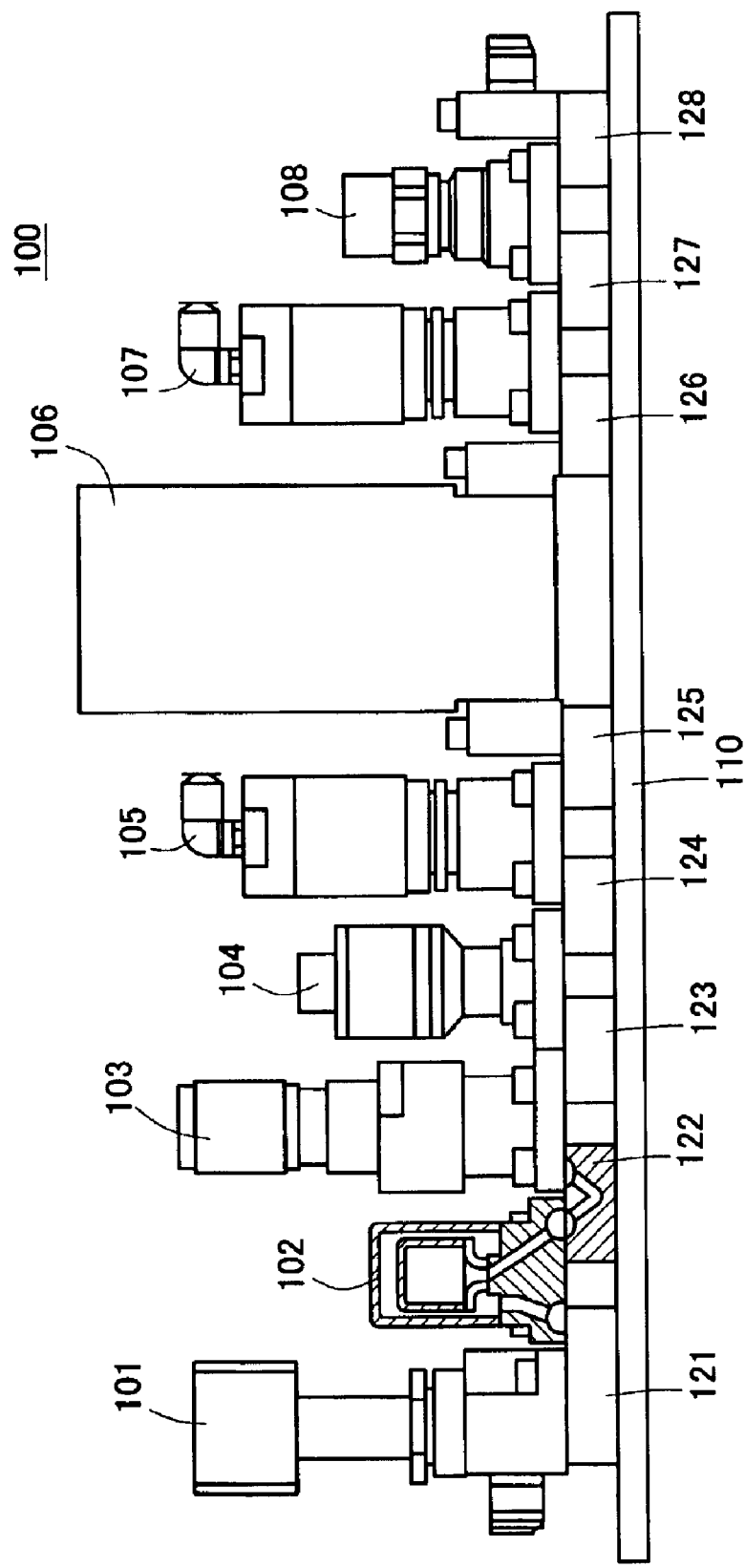
FIG. 17 is a section view showing an example of a conventional gas supply unit.
Figure 18:
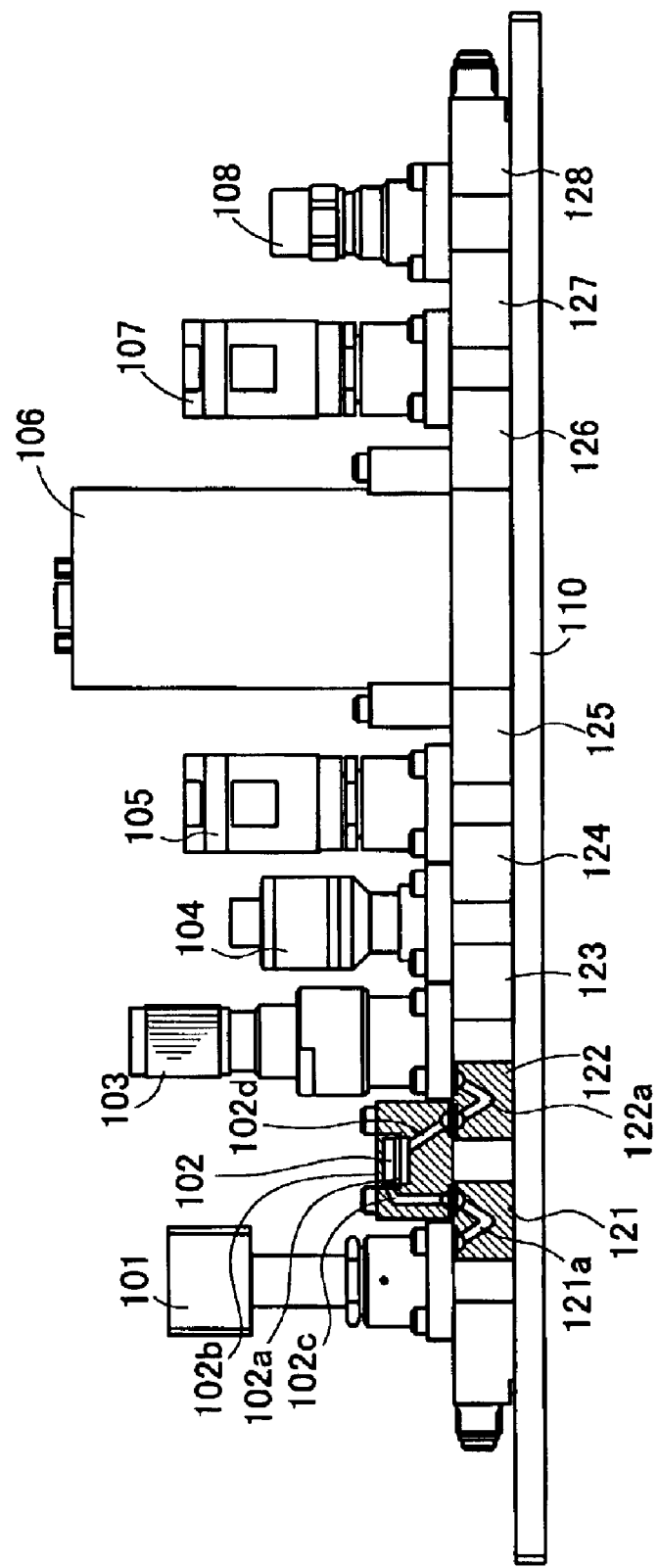
FIG. 18 is a section view showing another example of the conventional gas supply unit.
Figure 19:
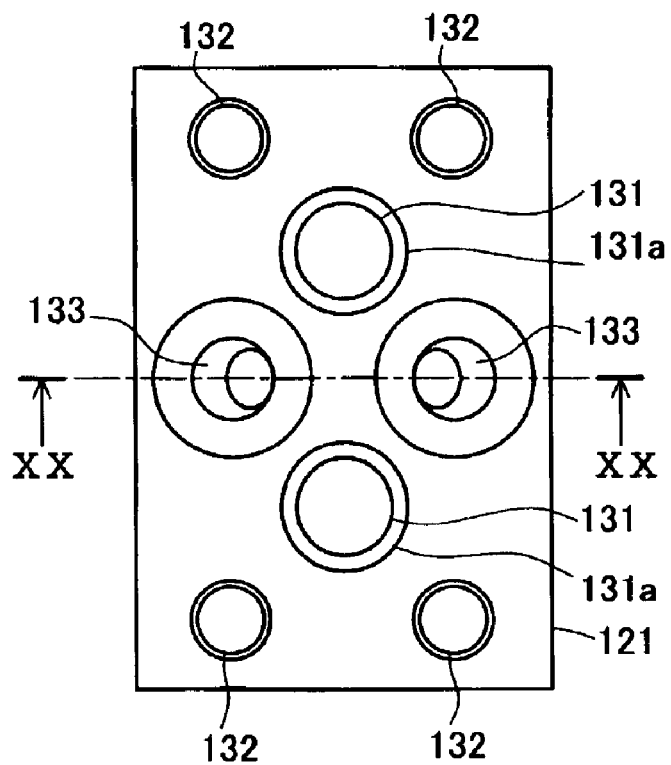
FIG. 19 is a plane view of a conventional passage block.
Figure 20:
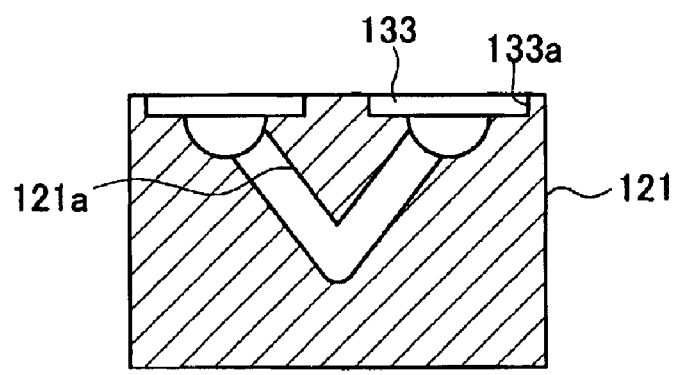
FIG. 20 is a section view of the passage block of FIG. 19.

In the conventional gas supply unit 100 shown in FIG. 17, gas having passed through the hand valve 101 is filtered by the filter 102 to remove impurities, and passes through the passage block 122 to sequentially flow through the regulator 103 and subsequent modules. At this time, the modules 101 to 108 are interconnected by means of the passage blocks 121 to 128 respectively. However, each block 121 to 128 merely has a V-shaped passage to connect an outlet port of each module 101 to 108 to an inlet port of an adjacent module. In the present embodiment, on the other hand, of the passage blocks 11 to 17 which connect the modules respectively in fluid communication, the passage block 11 newly designed to internally have a filter function is used to connect the hand valve 1 to the regulator 2. It is to be noted that other passage blocks 12 to 17 are configured to have a V-shaped passage as with the conventional blocks.

Figure 2:
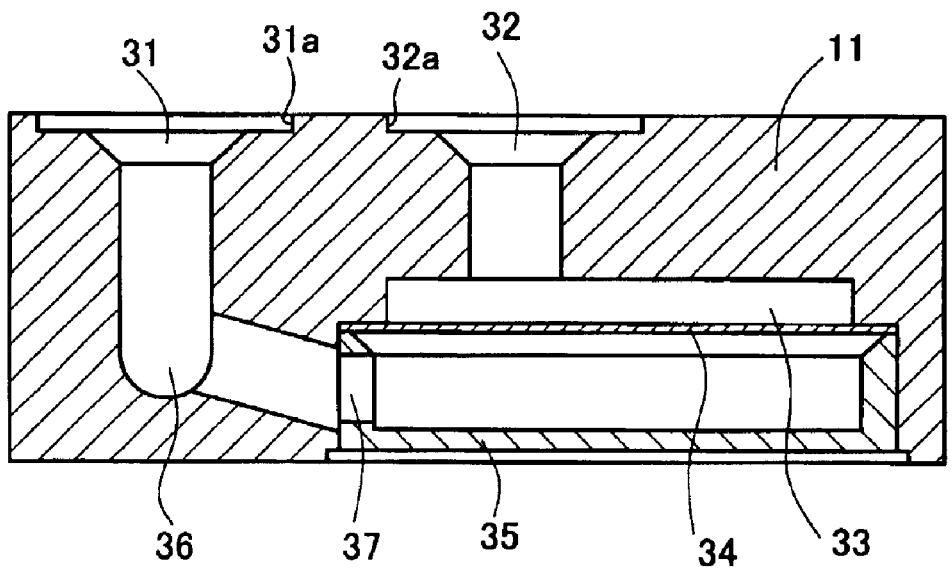
FIG. 2 is a section view of a passage block having a built-in filter.
Figure 3:
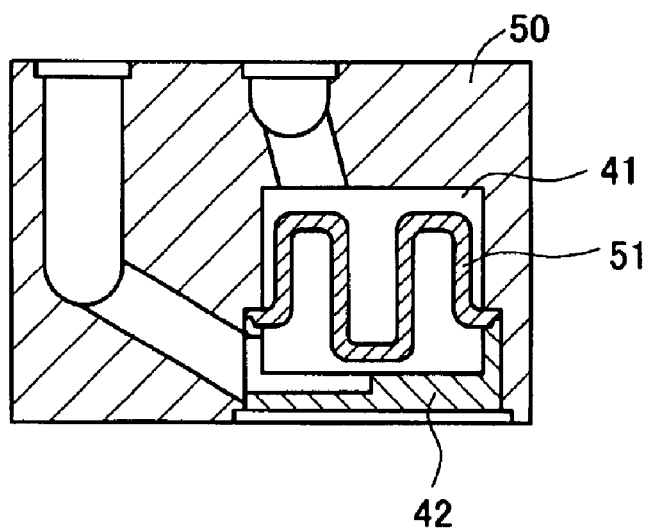
FIG. 3 is a section view of another passage block having a built-in filter of a three dimensional shape.
Figure 4:
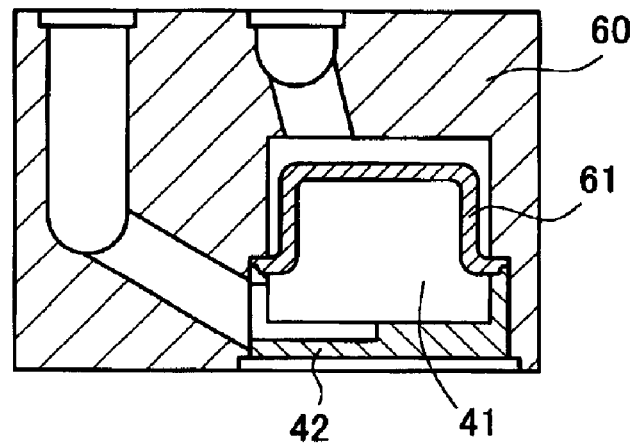
FIG. 4 is a section view of another passage block having a built-in filter of a three dimensional shape.
Figure 5:
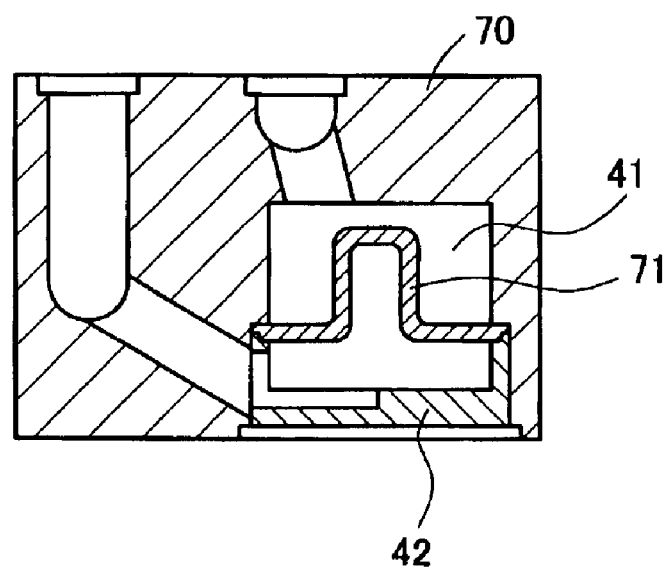
FIG. 5 is a section view of another passage block having a built-in filter of a three dimensional shape.
Figure 6:
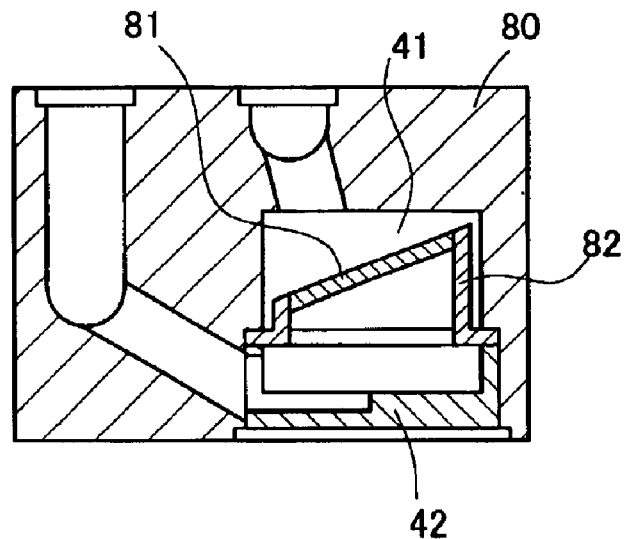
FIG. 6 is a section view of another passage block having a built-in filter disposed in an inclined position.
Figure 8:
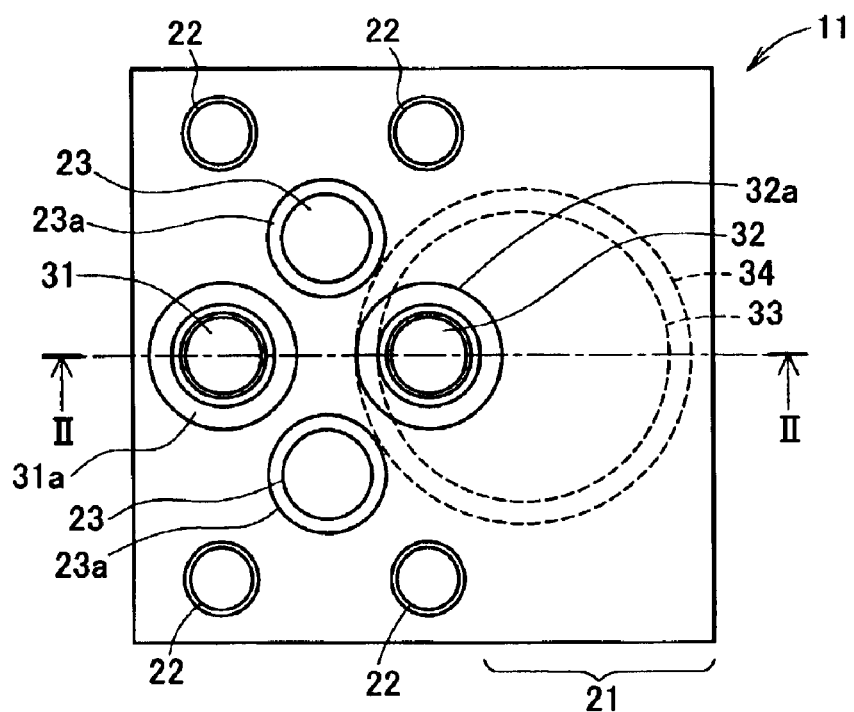
FIG. 8 is a plane view of the passage block of FIG. 2.

FIG. 2 is a section view of the passage block 11 with a built-in filter. FIG. 8 is a plane view of the passage block 11 of FIG. 2. FIG. 2 is a section view taken along the line II—II of FIG. 8.

This passage block 11 with a built-in filter has an upper surface formed with ports 31 and 32 which are connectable with the outlet port of the hand valve 1 and the inlet port of the regulator 2 respectively. These ports 31 and 32 are communicated with a filter cavity 33. This filter cavity 33 is a circular hole made from the bottom side of the block 11. A metal filter 34 is fitted in place on the ceiling side of the cavity 33 under pressure by a filter retainer 35 inserted into the cavity 33 from bottom to close the cavity 33.

The filter retainer 35 is a cup-like member including a cylindrical side wall in conformity in shape to an internal wall of the filter cavity 33 so that the retainer 35 is sealingly fitted in the cavity 33. A circumferential gap portion between the bottom of the filter retainer 35 and the passage block 11 is sealed by welding so that the filter retainer 35 is integrally fixed in the passage block 11, thereby preventing gas leakage from the filter cavity 33. An inlet side passage 36 communicated with the inlet port 31 has an opening at the internal wall of the filter cavity 33. In association therewith, in the cylindrical side wall, the filter retainer 35 is provided with a through hole 37 which is communicated with the inlet side passage 36. Accordingly, the filter retainer 35 has to be inserted in the cavity 33 with attention to the insertion position.

The passage block 11 is provided with an extension part 21 formed extending rightward in FIG. 8, namely, toward the adjacent passage block 12 of FIG. 1, different from the conventional passage block. This extension part 21 is positioned with no space between the adjacent blocks 11 and 12, as shown in FIG. 1. The filter cavity 33 is formed in the extension part 21 of the block 11, thus utilizing the space which would be produced between the conventional blocks, without needing an additional space. Thus, the gas supply unit can be made compact.

In FIG. 8, two through holes 23 are used for securing the passage block 11 to the base member 20 with bolts. Each through hole 23 is formed with a counter bore 23a which receives the head of a bolt. Four screw holes 22 are used for mounting a module serving as a fluid control device on a corresponding block with bolts. The ports 31 and 32 are formed with gasket holding parts 31a and 32a respectively for each holding a seal gasket.

The gas supply unit 10 is constructed such that the hand valve 1, the regulator 2, and other modules 3 to 7 are interconnected through the passage block 11 with a built-in filter and other standard passage blocks 12 to 17. This unit 10 is arranged on one flow passage to constitute a gas supply line. The inlet port 8 of the unit 10 is communicated with a gas supply source through pipes while the outlet port 9 is communicated with the chamber through pipes. Plural gas supply units 10 each constructed as above are arranged in an appropriate formation and connected with each other through pipes to constitute a gas supply circuit. The number of gas supply units 10 is determined according to the kind of gas to be used.

The flow of gas in one of the gas supply units 10 constituting the gas supply circuit is shown below. The gas having come in the inlet port 8 is sequentially delivered to the hand valve 1 and the regulator 2. When the gas delivered from the valve 1 to the regulator 2 through the passage block 11 with the built-in filter, mixed impurities are removed from the gas. After removal of the impurities, the gas is pressure-regulated by the regulator 2 and then delivered toward an outlet side. At this time, the gas pressure is monitored by the pressure transducer 3. The gas is subsequently allowed to pass through the shutoff valve 4 to flow in the massflow controller 5 in which the gas is controlled to a predetermined flow quantity. The gas of a set pressure and a controlled flow quantity is then delivered through the gas supply valve 6 and the check valve 7 to the chamber through the outlet port 9.

Furthermore, the passage block 11 which is the feature of the present embodiment is shown in more detail. The gas coming out of the hand valve 1 flows into the inlet side passage 36 through the port 31, and flows in the filter retainer 35 through the through hole 37. At this time, the gas having flowed in the filter retainer 35 through the inlet side passage 36 slows down in flow velocity, so that the mixed impurities remain there and also are removed by the metal filter 34. The gas from which the mixed impurities have been removed is delivered to the regulator 2 through the port 32.

In the gas supply unit 10 in the present embodiment, instead of using a filter as a module constituting the unit, the passage block 11 designed to have the built-in filter is used. Accordingly, the length of the unit can be reduced as compared with the conventional unit. For instance, in the case that the conventional gas supply unit 100 has a total length of 430 mm, the gas supply unit 10 in the present embodiment can have a total length of 390 mm. Such compact unit is also lightweight. Thus, as compared with the conventional gas supply unit 100, the difficult work of assembling plural units and installing those units in a place of a restricted space can be eased.

Meanwhile, in the case that a gas supply unit having the same configuration as above is constructed of modules made more compact, the passage block with a built-in filter would be reduced in size of the filter constituting part. This reduces the area of a passage in the block, so that gas is not allowed to smoothly flow in the passage. To avoid such disadvantages, subsequent explanation is made on the passage block with a built-in filter configured to ensure a sufficient quantity of gas flow.

FIGS. 3 to 6 are section views of passage blocks each having a built-in filter different in shape. It is to be noted that common elements in the figures are explained with the same reference numbers. Each of the passage blocks 50, 60, 70, and 80 shown in FIGS. 3 to 6 respectively is configured such that a larger area of a passage is ensured in a filter portion. Among them, the passage blocks 50, 60, and 70 are provided with three-dimensional metal filters 51, 61, 71, respectively. The passage block 80 is provided with a metal filter 81 disposed in an inclined position.

This is to increase a surface area of each metal filter. More specifically, the metal filters 51, 61, and 71 are each formed in a three dimensional shape to allow gas to flow through the side surface of the filter in addition to the upper and lower surfaces. The metal filter 81 shown in FIG. 6, on the other hand, is formed in a flat shape similar to that in the first embodiment (see FIG. 2) but disposed in an inclined position to increase the area of the filter itself. The metal filters 51, 61, 71, and 81 are configured so as to extend in a vertical position. Accordingly, each filter cavity 41 is formed deeper in a vertical direction of each block as compared with the filter cavity 33 in the first embodiment (FIG. 2). In each filter cavity 41, each of the metal filters 51, 61, 71, and 81 is fitted and pressed by a filter retainer 42 inserted from below. With this filter retainer 42, the filter cavity 41 is sealed.

According to the passage blocks 50, 60, 70, and 80, as in the case of the above embodiment, a filter can be eliminated from among the modules constituting the gas supply unit, achieving a compact unit with a reduced length. In addition, a small-sized integrated unit can also be constructed to provide a sufficient quantity of gas flow, without reducing a passage in a filter portion.

Figure 7:
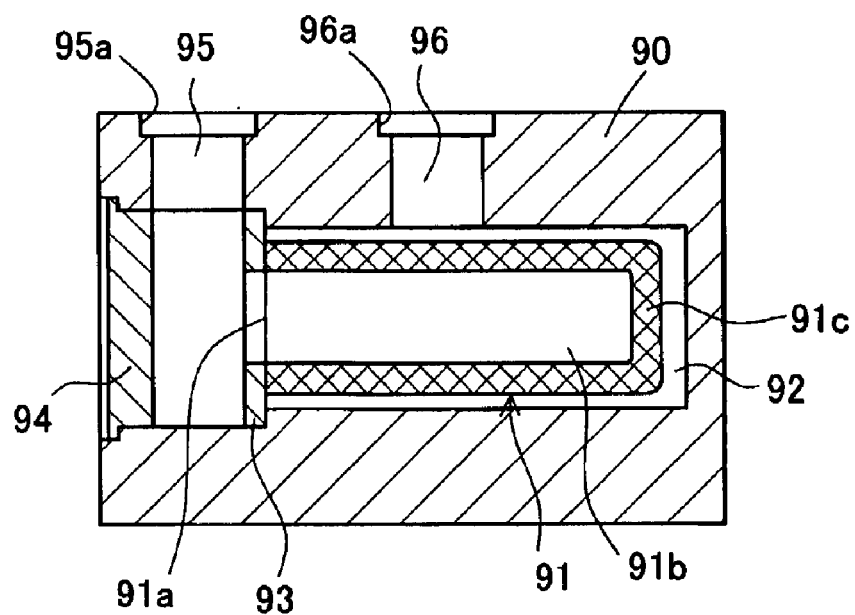
FIG. 7 is a section view of another passage block having a built-in filter inserted in a lateral or horizontal direction.

Next, another example of the passage block with a built-in filter for ensuring a sufficient quantity of gas flow is described with reference to FIG. 7. FIG. 7 is a section view of the passage block 90. This passage block 90 is configured such that a metal filter 91 is inserted horizontally or sideways in a filter cavity 92 with an opening 92a made in a side surface of the block 90, different from the above mentioned passage blocks. The metal filter 91 is of a hollow cylindrical shape having an open end 91a and a closed end 91c. An annular plate 93 is concentrically fixed to the open end 91a of the filter 91. Thus, the filter 91 is inserted from its closed end 91c into the cavity 92 and the annular plate 93 is fitted in place to position the filter 91 as shown in FIG. 7 so that a center hollow 91b of the filter 91 is communicated with the port 95 through the open end 91a and with the port 96 through the filter 91. The opening 92a of the cavity 92 is sealingly closed by a cap 94. Thus, the passage block 90 is constructed such that the metal filter 91 is disposed between ports 95 and 96. Accordingly, the gas having delivered into the block 90 through the port 95 is allowed to flow in the center hollow 91b of the filter 91 through the open end 91a and then pass through the filter 91 to flow out to the outside thereof toward the port 96.

Figure 9:
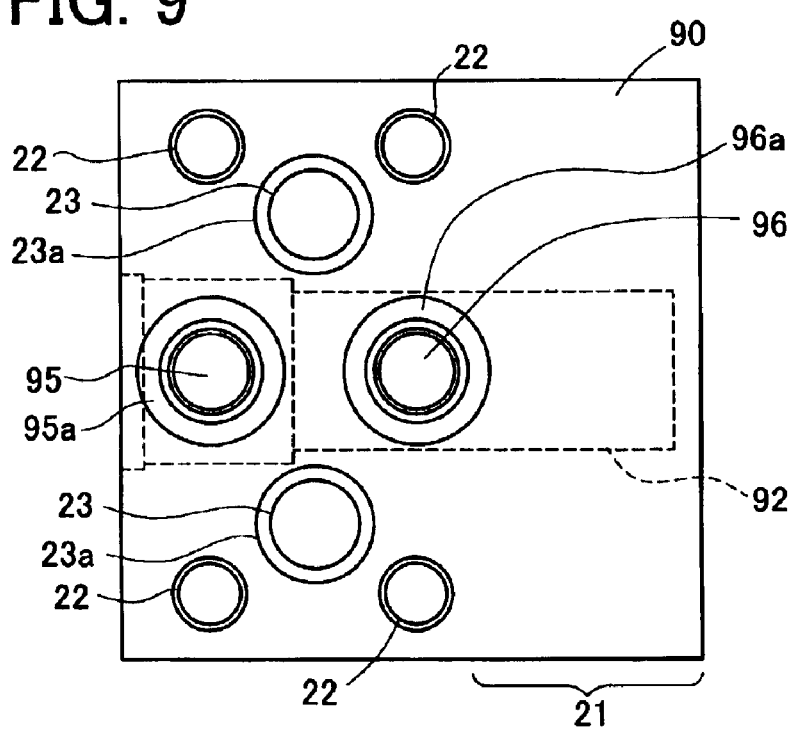
FIG. 9 is a plane view of the passage block of FIG. 7.

FIG. 9 is a plane view of the passage block 90 of FIG. 7, seen from above.

The passage block 90 is provided with an extension part 21 formed extending rightward in FIG. 9, namely, toward the adjacent passage block 12 of FIG. 1, different from the conventional passage block. In this example, the block 90 is substituted for the block 11 in FIG. 1 to constitute the gas supply unit. This extension part 21 is positioned with no space between the adjacent blocks 90 and 12. The filter cavity 92 is formed in the extension part 21 of the block 90, thereby utilizing the space which would be produced between the conventional blocks, without needing an additional space. This makes it possible to reduce the size of a gas supply unit.

In FIG. 9, two through holes 23 are used for securing the passage block 90 to the base member 20 with bolts. Each through hole 23 is formed with a counter bore 23a which receives the head of a bolt. Four screw holes 22 are used for mounting a module serving as a fluid control device on a corresponding block with bolts. The ports 95 and 96 are formed with gasket holding parts 95a and 96a respectively for each holding a seal gasket.

According to the passage block 90 constructed as above, as in the case of the above embodiment, a filter can be eliminated from among the modules constituting the gas supply unit, achieving a compact unit with a reduced length. Additionally, a small-sized integrated unit can also be constructed to provide a sufficient quantity of gas flow, without reducing a passage in a filter portion.

Figure 10:
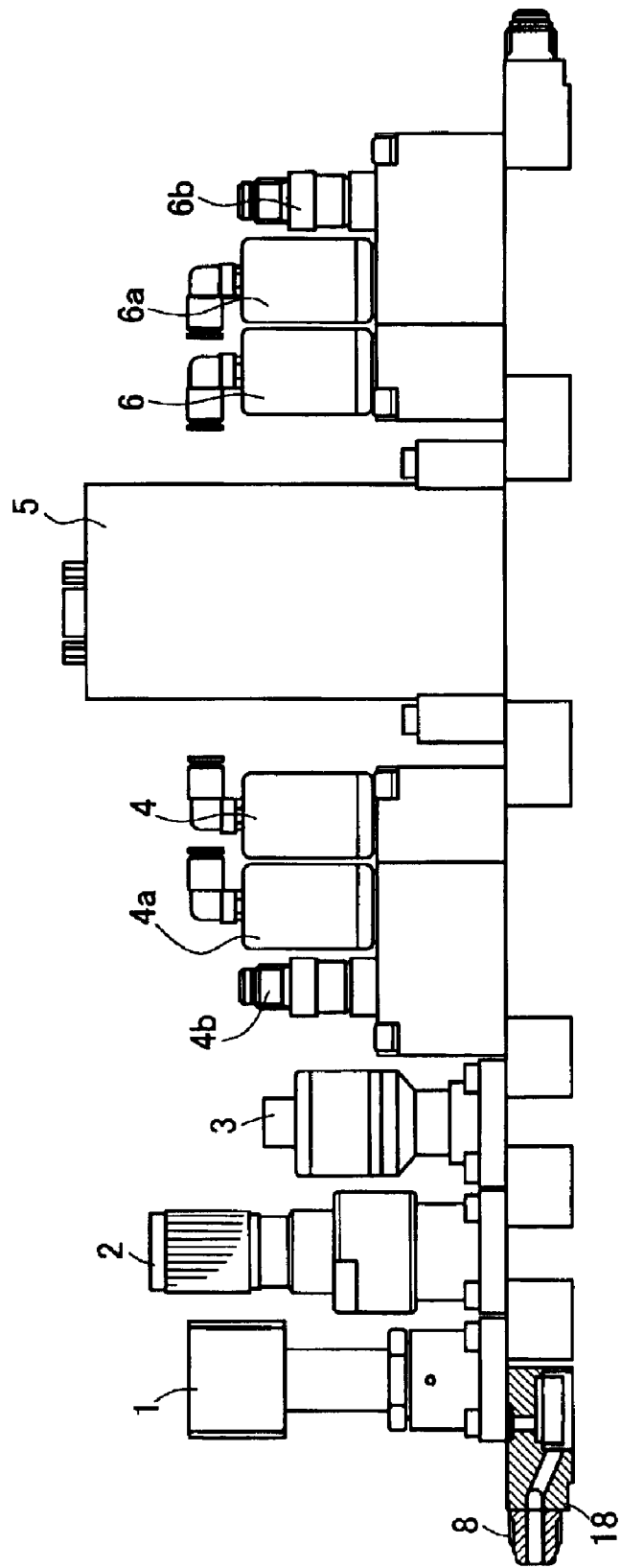
FIG. 10 is a side view of an entire gas supply unit in a second embodiment according to the invention.
Figure 11:
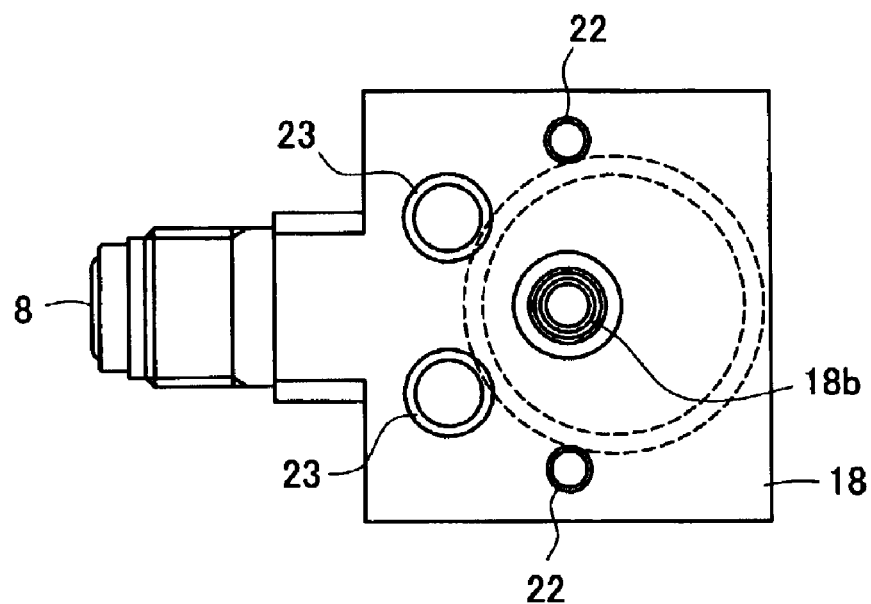
FIG. 11 is a plane view of a passage block having a built-in filter.
Figure 12:
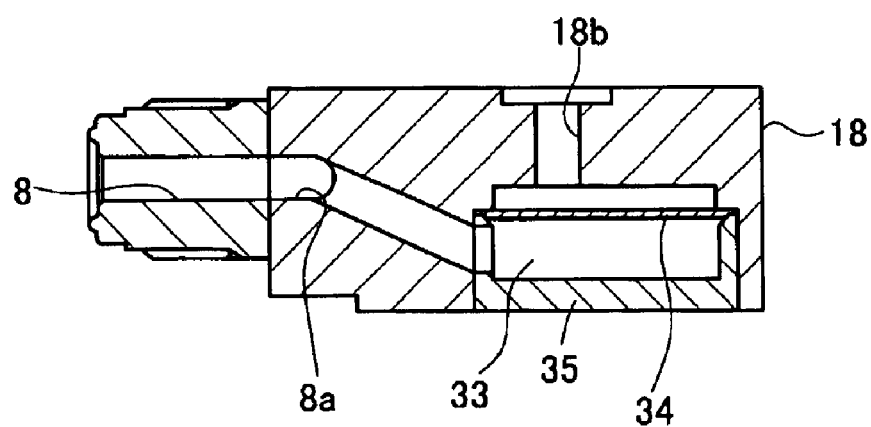
FIG. 12 is a section view of the passage block of FIG. 11.

Next, a second embodiment of the present invention is explained with reference to FIGS. 10 to 12. FIG. 10 is a side view of an entire gas supply unit in the second embodiment. FIG. 11 is a plane view of a passage block and FIG. 12 is a section view of the block of FIG. 11. The feature in the second embodiment different from the first embodiment is in disposing a filter cavity upstream of a hand valve 1. More specifically, a passage block 18 having a built-in filter is newly provided. This passage block 18 is formed at a left end with an inlet port 8a.

This passage block 18 is formed with a port 18b which is opened in the upper surface of the block 18 and is connectable to an inlet port of the hand valve 1. The inlet port 8a and the port 18b are communicated with each other through a filter cavity 33. This filter cavity 33 is a circular hole made from the bottom of the block 18. A metal filter 34 is fitted in place on the ceiling side of the cavity 33 under pressure by a filter retainer 35 inserted in the cavity 33 from bottom.

The filter retainer 35 is a cup-like member with a cylindrical side wall in conformity in shape to an internal wall of the filter cavity 33 so that retainer 35 is sealingly fitted in the cavity 33. A circumferential gap portion between the bottom of the filter retainer 35 and the passage block 18 is sealed by welding so that the retainer 35 is integrally fixed in the block 18, thereby preventing gas leakage from the cavity 33.

Figure 13:
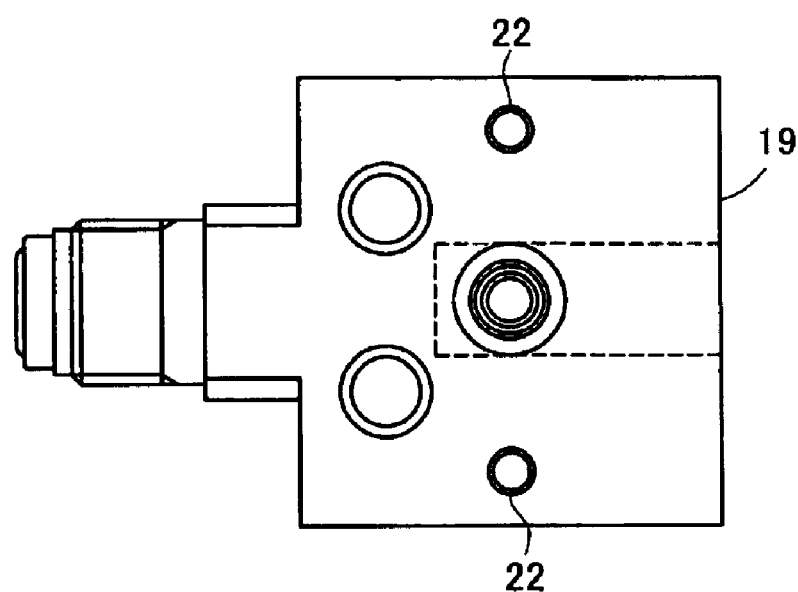
FIG. 13 is a plane view of another passage block having a built-in filter.
Figure 14:
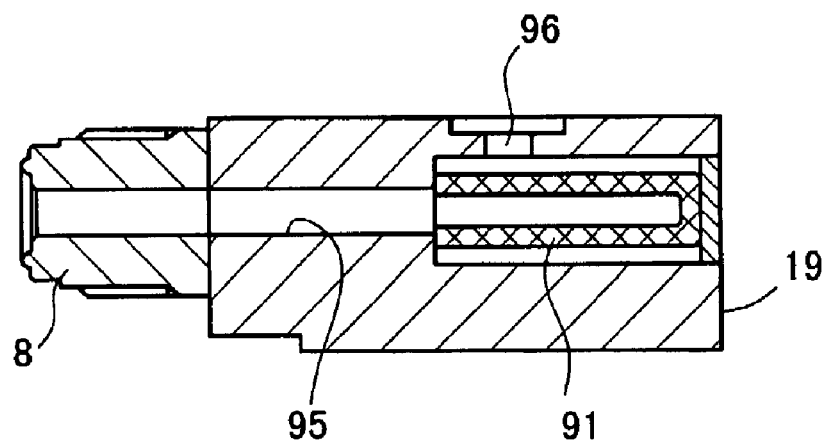
FIG. 14 is a section view of the passage block of FIG. 13.

An example that a passage block having the filter of the type shown in FIG. 7 is disposed upstream of the hand valve 1 is shown in FIGS. 13 and 14 which are a plane view and a section view respectively. The structure, except for the position of the block disposed in the gas supply unit, is identical to that in FIG. 7 and therefore the details thereof are omitted herein.

Figure 15:
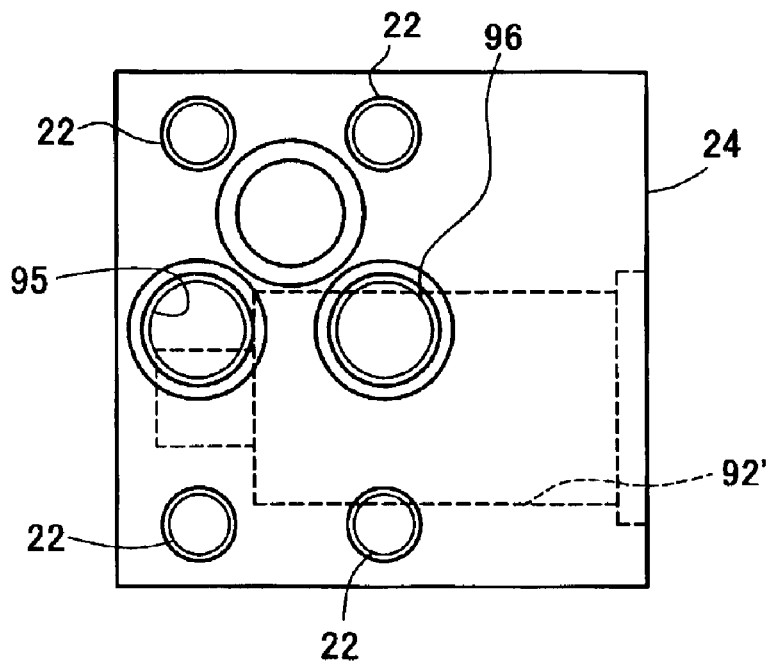
FIG. 15 is a plane view of another passage block having a built-in filter.
Figure 16:
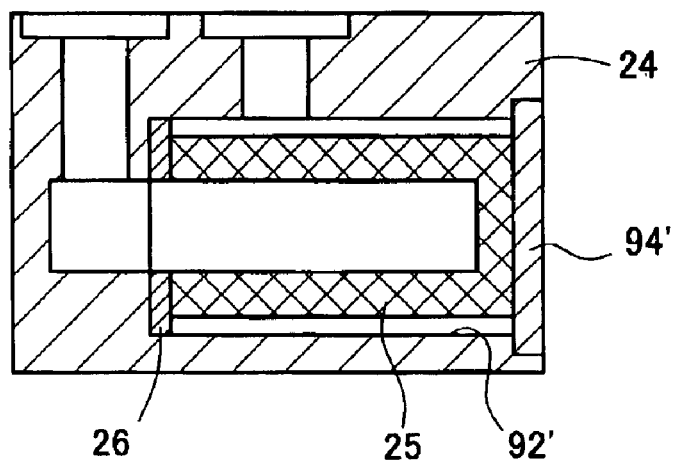
FIG. 16 is a section view of the passage block of FIG. 15.

Furthermore, FIG. 15 shows another example of a passage block in which a filter of an identical shape to that in FIG. 7 is inserted in a different direction from in FIG. 7. FIG. 16 is a section view of the block of FIG. 15. In this example, a filter 25 has a hollow cylindrical shape having a closed end and an open end as with the filter 91 in FIG. 7. However, different from the filter 91, this filter 25 is inserted from its open end into a filter cavity 92' of a passage block 24 and positioned in place by a cap 94' fitted in an opening of the cavity 92' made in a side surface of the block 24. As in the case of the filter 91 in FIG. 7, the gas having delivered into the block 24 is allowed to flow in the center hollow of the filter 25 through the open end thereof and pass through the filter 25 to flow out to the outside thereof. A gasket 26 is sandwiched between the open end of the filter 25 and the cavity 92' of the passage block 24 to prevent gas leakage from a gap between the filter 25 and the block 24.

The present invention may be embodied in other specific forms without departing from the spirit or essential characteristics thereof. For instance, although the passage block 11 with the built-in filter is disposed between the hand valve 1 and the regulator 2, it may be arranged in another position.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A gas supply unit including a base member, two or more fluid control devices, and a plurality of passage blocks attached to an upper surface of the base member and lower surfaces of the fluid control devices,
   wherein one of the passage blocks includes
   an inlet port and an outlet port,
   a filter cavity sealingly formed between the inlet port and the outlet port, and
   a filter built in the filter cavity.

2. The gas supply unit according to claim 1, wherein the filter has a three dimensional shape.

3. The gas supply unit according to claim 1, wherein the filter is disposed in an inclined position in the filter cavity.

4. The gas supply unit according to claim 1, wherein the passage block with the built-in filter connects one fluid control device disposed in the most upstream position among the fluid control devices with an adjacent fluid control device to the fluid control device.

5. The gas supply unit according to claim 1, wherein the passage block with the built-in filter is placed more upstream than the fluid control device disposed in the most upstream position among the fluid control devices.

6. A gas supply unit including a base member, two or more fluid control devices, and a plurality of passage blocks attached to an upper surface of the base member and lower surfaces of the fluid control devices,
   wherein one of the passage blocks includes
   an inlet port and an outlet port,
   a filter cavity formed between the inlet port and the outlet port and provided with an opening on a base member side, and
   a metal filter built in the filter cavity, and
   the metal filter is positioned by a filter retainer of a cup-like shape having an upward opening to sealingly close the filter cavity,
   the block is provided with an inlet passage formed through a side wall of the filter retainer to bring the filter cavity in communication with the inlet port, and
   the block is further provided with an outlet passage formed above the metal filter to bring the filter cavity in communication with the outlet port.

7. The gas supply unit according to claim 6, wherein the filter has a three dimensional shape.

8. The gas supply unit according to claim 6, wherein the filter is disposed in an inclined position in the filter cavity.

9. The gas supply unit according to claim 6, wherein the passage block with the built-in filter connects one fluid control device disposed in the most upstream position among the fluid control devices with an adjacent fluid control device to the fluid control device.

10. The gas supply unit according to claim 6, wherein the passage block with the built-in filter is placed more upstream than the fluid control device disposed in the most upstream position among the fluid control devices.

11. A gas supply unit including a base member, two or more fluid control devices, and a plurality of passage blocks attached to an upper surface of the base member and lower surfaces of the fluid control devices, wherein one of the passage blocks includes
an inlet port and an outlet port,
a filter cavity formed between the inlet port and the outlet port and provided with an opening in a side surface of the block, and
a filter built in the filter cavity, and
the filter has a cylindrical shape having an open end and a closed end and is positioned in place when inserted in the filter cavity through the opening thereof, the filter being communicated with the inlet port through the open end and the inlet port being communicated with the outlet port through the filter.

12. The gas supply unit according to claim 11, wherein the passage block connects one fluid control device disposed in the most upstream position among the fluid control devices with an adjacent fluid control device to the fluid control device.

13. The gas supply unit according to claim 11, wherein the passage block with the built-in filter is placed more upstream than the fluid control device disposed in the most upstream position among the fluid control devices.

14. A passage block, shaped as a rectangular parallelepiped block, having a lower surface which is in contact with a base member and an upper surface which is in contact with a fluid control device when the passage block is disposed between the base member and the fluid control device, the passage block including:

an inlet port formed in the upper surface;
an outlet port formed in the upper surface;
a through hole through which a bolt passes to connect the passage block with the base member;
a screw hole in which a bolt is screwed to connect the fluid control device with the passage block;
a filter cavity sealingly formed between the inlet port and the outlet port; and
a filter built in the filter cavity.

15. The passage block according to claim 14, wherein
the filter cavity has an opening in the lower surface of the block,
the filter is a metal filter,
the block further includes a filter retainer of a cup-like shape having an upward opening to position the metal filter in place in the filter cavity and sealingly close the filter cavity,
the block is provided with an inlet passage formed through a sidle wall of the filter retainer to provide communication between the filter cavity and the inlet port, and
the block is further provided with an outlet passage formed above the metal filter to provide communication between the filter cavity and the outlet port.

16. The passage block according to claim 14,
wherein the passage block includes four screw holes to be used for connecting the fluid control device with the passage block, two of the screw holes being arranged in point symmetrical relation to the inlet port and the other two being arranged in point symmetrical relation to the outlet port.

17. The passage block according to claim 14, wherein the screw holes are formed in two symmetrical positions about the inlet port and in two symmetrical positions about the outlet port.

18. The passage block according to claim 15, wherein
wherein the passage block includes four screw holes to be used for connecting the fluid control device with the passage block, two of the screw holes being arranged in point symmetrical relation to the inlet port and the other two being arranged in point symmetrical relation to the outlet port.

19. The passage block according to claim 15,
wherein the screwholes are formed in two symmetrical positions about the inlet port and in two symmetrical positions about the outlet port.

20. A passage block, shaped as a rectangular parallelepiped block, having a lower surface which is in contact with a base member and an upper surface which is in contact with a fluid control device when the passage block is attached between the base member and the fluid control device, the passage block including:

a first port formed in a side surface of the block;
a second port formed in the upper surface;
a through hole through which a bolt passes to connect the passage block with the base member;
a screw hole in which a bolt is screwed to connect the fluid control device with the passage block;
a filter cavity sealingly formed between the first port and the second port; and
a filter built in the filter cavity.

21. The passage block according to claim 20,
wherein the filter cavity has an opening in the lower surface of the block,
the filter is a metal filter,
the block further includes a filter retainer of a cup-like shape having an upward opening to position the metal filter in place in the filter cavity and sealingly close the filter cavity,
the block is provided with a first passage formed through a side wall of the filter retainer to provide communication between the filter cavity and the first port, and
the block is further provided with a second passage formed above the metal filter to provide communication between the filter cavity and the second port.

22. The passage block according to claim 20,
wherein the block includes two screw holes to be used for connecting the fluid control device with the passage block, the screw holes being arranged in point symmetrical relation to the second port.

23. The passage block according to claim 20,
wherein the screw holes are formed in two symmetrical positions about the second port.

24. The passage block according to claim 21, wherein
wherein the block includes two screw holes to be used for connecting the fluid control device with the passage block, the screw holes being arranged in point symmetrical relation to the second port.

25. The passage block according to claim 21,
wherein the screw holes are formed in two symmetrical positions about the second port.

* * * * *